(12) United States Patent
Poggi (10) Patent No.: US 12,372,160 B2
(45) Date of Patent: Jul. 29, 2025

(54) SELF-RESETTING SHUT-OFF VALVE

(71) Applicant: Roberto Poggi, Lerici (IT)

(72) Inventor: Roberto Poggi, Lerici (IT)

(73) Assignee: Roberto Poggi, Lerici (IT)

( * ) Notice: Subject to any disclaimer, the term of this patent is extended or adjusted under 35 U.S.C. 154(b) by 73 days.

(21) Appl. No.: 18/226,307

(22) Filed: Jul. 26, 2023

(65) Prior Publication Data

US 2024/0271710 A1    Aug. 15, 2024

(30) Foreign Application Priority Data

Jul. 28, 2022 (IT) .................... 102022000015975

(51) Int. Cl.
*F16K 21/04* (2006.01)

(52) U.S. Cl.
CPC .................... *F16K 21/04* (2013.01)

(58) Field of Classification Search
CPC .......... F16K 21/04; F16K 21/10; F16K 21/16; F16K 31/48
See application file for complete search history.

(56) References Cited

U.S. PATENT DOCUMENTS

| 4,522,221 | A | 6/1985 | Chivens et al. | |
|---|---|---|---|---|
| 4,558,719 | A | 12/1985 | Rinkewich | |
| 7,509,973 | B1* | 3/2009 | Deive | F16K 17/34 |
| | | | | 251/74 |
| 9,010,360 | B1* | 4/2015 | Older | G05B 15/02 |
| | | | | 137/599.05 |
| 11,280,420 | B1* | 3/2022 | Feldman | F16K 21/06 |

FOREIGN PATENT DOCUMENTS

| CH | 140809 | 6/1930 |
|---|---|---|
| IT | VI20 130 07 4 | 9/2014 |
| KR | 20130035056 | 4/2013 |
| WO | 8501562 | 4/1985 |
| WO | 2015110849 | 7/2015 |

OTHER PUBLICATIONS

Search Report dated Mar. 21, 2023; Application No. IT102022000015975; 11 pages.

* cited by examiner

*Primary Examiner* — Michael R Reid
(74) *Attorney, Agent, or Firm* — Erik J. Overberger; RANKIN, HILL & CLARK LLP (57) ABSTRACT

A shut-off valve (100) comprises a first chamber (1) and a second chamber (2) in fluid communication, an opening (3) connecting the first chamber (1) and the second chamber (2). The valve (100) comprises adjustment means (41, 42, 43) that can be switched between a closing and an opening configuration. The adjustment means (41, 42, 43) comprise: a first adjustment portion (41), a second adjustment portion (42) connected to the first adjustment portion (41), elastic return means (5) arranged at least at the first adjustment portion (41), an intermediate adjustment portion (43), connected to the first adjustment portion (41). The valve (100) further comprises a closing element (6) configured to be sealingly arranged at the opening (3) and to interrupt fluid communication between the first chamber (1) and the second chamber (2), and a switch (7) activatable by said second adjustment portion (42), connected to the closing element (6) and configured to prevent or allow translation of said closing element (6).

10 Claims, 12 Drawing Sheets

SELF-RESETTING SHUT-OFF VALVE

TECHNICAL FIELD

The present disclosure relates to a shut-off valve. The shut-off valve according to the present disclosure is useful as a safety valve for pipelines of both liquid and gaseous fluids, specifically pressurised liquids. In particular, the shut-off valve according to the present disclosure is applicable in the domestic environment for the protection of water lines, in order to intercept any flow of water in the event of a break in the line or failure to shut off the utility, for example due to forgetfulness.

DESCRIPTION OF THE PRIOR ART

Shut-off valves are known in the state of the art to ensure safety in the event of abnormal flows of liquid or gaseous fluids. For example, document IT VI20 130 074 A1 describes a fluid interception device. The device comprises a shut-off body defining an inlet duct, which can be associated with a supply network, and an outlet duct, which can be associated with a distribution network. The shut-off body is associated with a shutter element configured to switch between an opening condition to allow fluid to pass from the inlet duct to the outlet duct, and a closing condition to block the passage of fluid. The device comprises a control element configured to switch from a resting to an activating condition following the uninterrupted passage of a preset amount of fluid through the shut-off body. The control device in the activating condition is configured to act on the shutter element and bring it from the opening to the closing condition. The device also includes a reset device, which is configured to act on the control device to return it to its resting condition following the interruption of continuous fluid flow through the shut-off body.

Problem of the Prior Art

As functional as known technology shut-off valves are, they are cumbersome and include numerous components that increase the total cost of the valve.

LIST OF FIGURES

Further characteristics and advantages will become more apparent from the following indicative, and hence non-limiting, description of a preferred, but not exclusive, embodiment of a shut-off valve as illustrated in the appended drawings, in which.

DETAILED DESCRIPTION

With reference to the attached figures, a shut-off valve is indicated by the numerical reference 100.

The valve 100 is configured to be activated by a fluid, for example a liquid or a gas. Preferably the valve 100 is applied to water pipes.

The valve 100 comprises a valve body 101 that extends predominantly along a main direction X.

Figure 11:
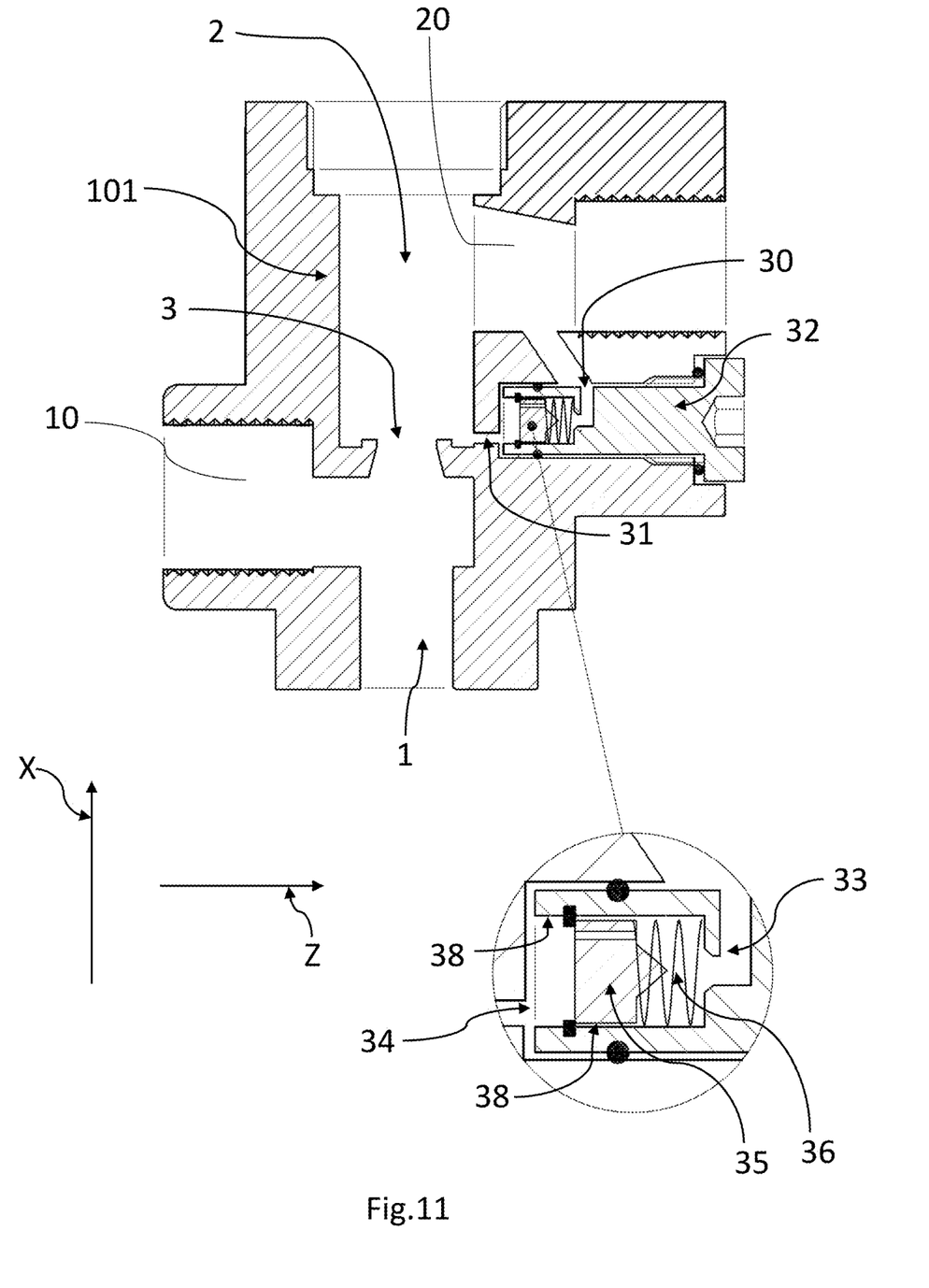
FIG. 11 is a cross-sectional side view of a third chamber of the valve according to the present invention.

With particular reference to FIG. 11, the shut-off valve 100 has a first chamber 1 having an inlet mouth 10 to allow the passage of a fluid, e.g. water.

The inlet mouth 10 can be connected to an inlet duct upstream of the first chamber 1.

The valve 100 has a second chamber 2 in fluid communication with the first chamber 1. In particular, the second chamber 2 is located downstream of the first chamber 1. The second chamber 2 comprises an outlet mouth 20 for a fluid. This outlet mouth 20 can be connected to an outlet duct downstream of the second chamber 2.

The valve 100 has a connection opening 3 between the first chamber 1 and the second chamber 2. In other words, the first chamber 1 and the second chamber 2 are separated from each other by the opening 3. In detail, the second chamber 2 is designed to fill with fluid following the filling of the first chamber 1.

Figure 1:
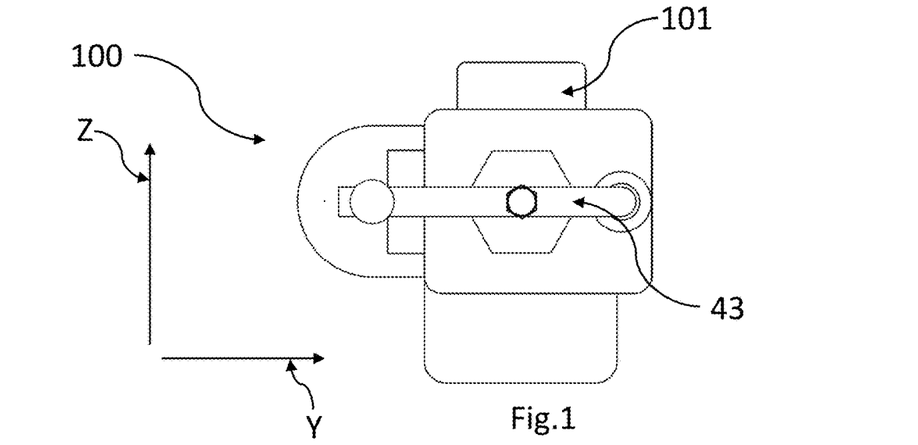
FIG. 1 is a top view of a valve according to a first embodiment of the present invention.
Figure 2:
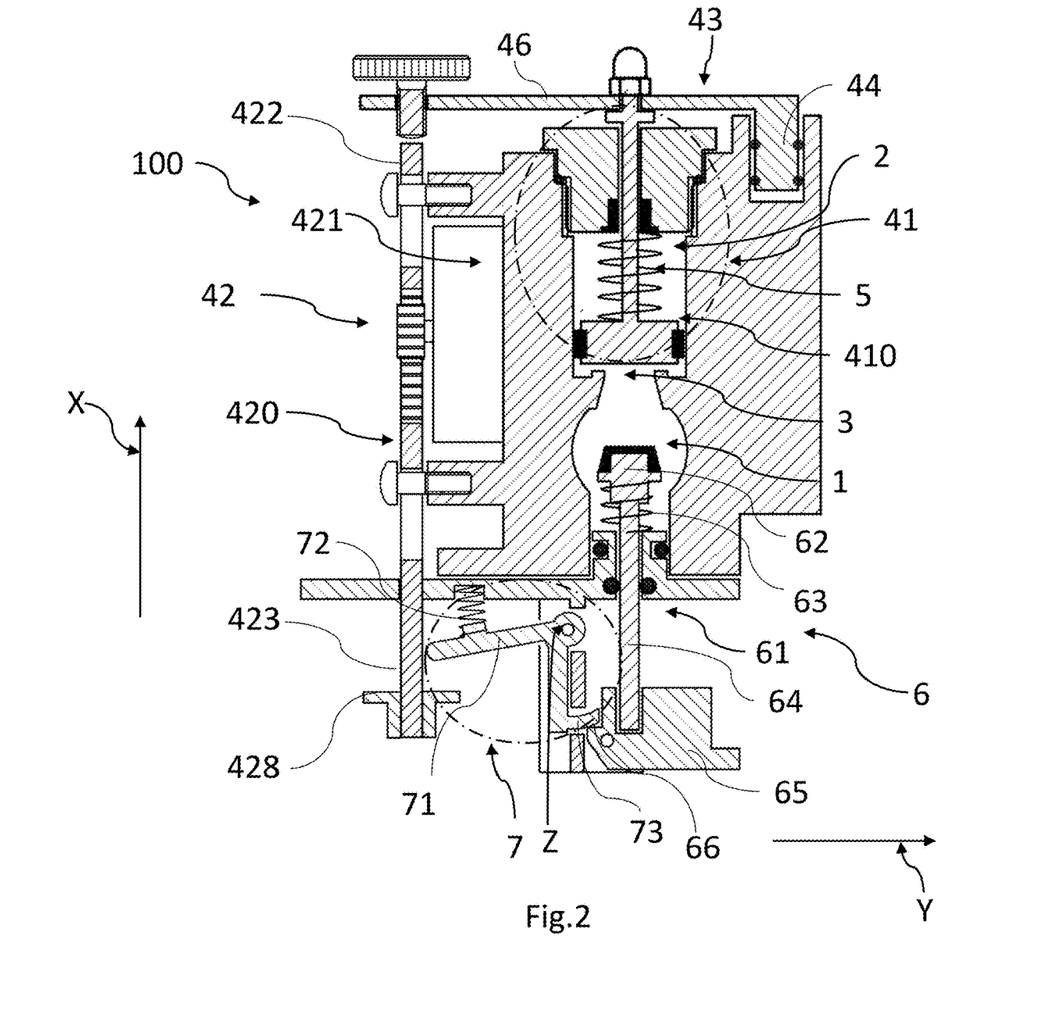
FIG. 2 is a cross-sectional front view of the valve in FIG. 1 in a first opening configuration.
Figure 6:
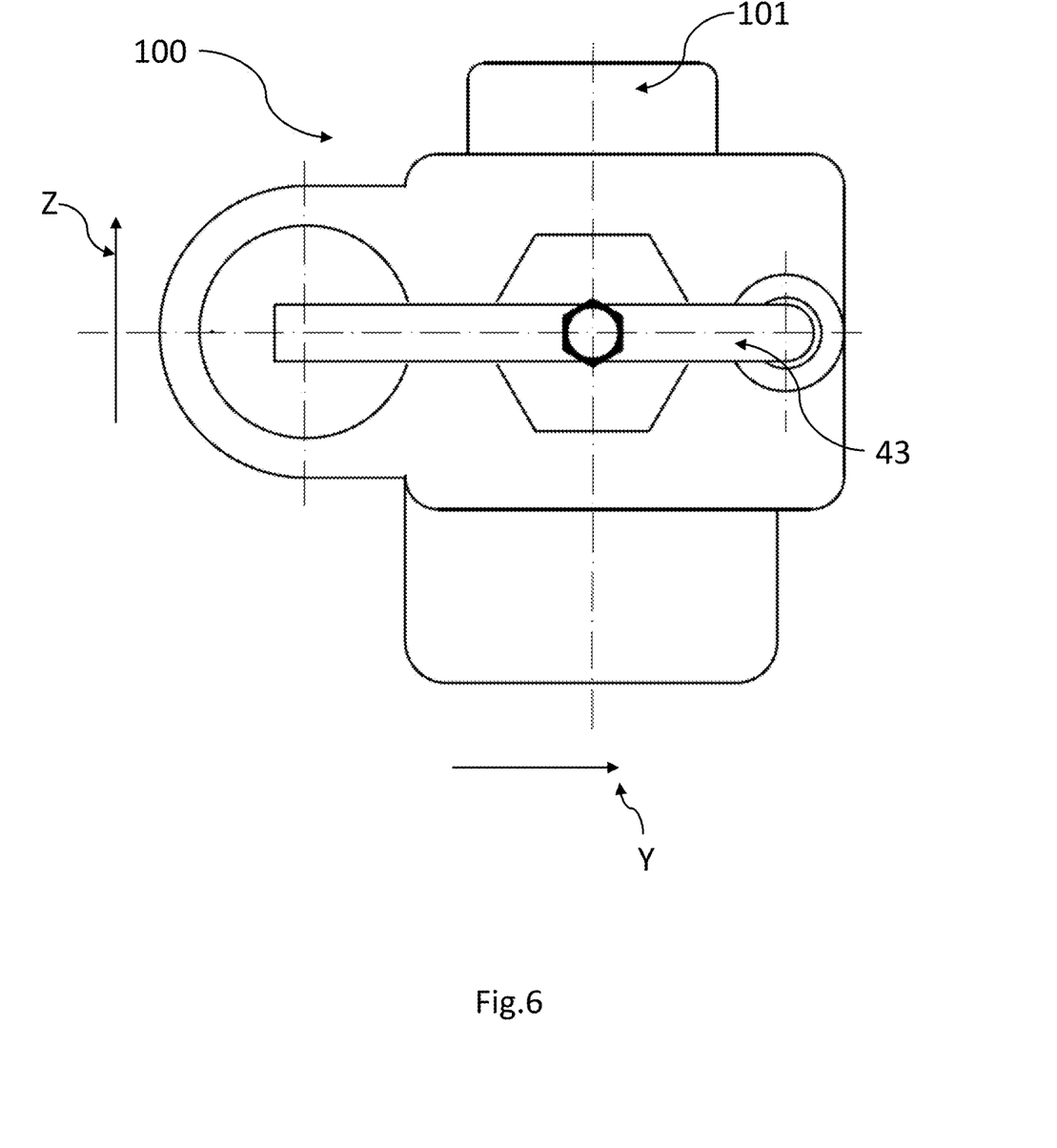
FIG. 6 is a top view of a valve according to a second embodiment of the present invention.

With reference to FIGS. 2 and 6, the valve 100 comprises adjustment means 41, 42, 43 switchable between a closing and an opening configuration.

In particular, the adjustment means 41, 42, 43 comprise a first adjustment portion 41, at least in part inserted in the second chamber 2. The first adjustment portion 41 is configured to translate parallel to the main direction X. In detail, the first adjustment portion 41 is configured to switch at least from a proximal position to a distal position, with respect to the opening 3, to switch from the opening configuration to the closing configuration. In other words, when the first adjustment portion 41 switches from the proximal to the distal position, the first adjustment portion 41 translates away from the opening 3.

More details regarding the first adjustment portion 41 will be provided in a later part of this description.

The adjustment means 41, 42, 43 further comprise a second adjustment portion 42 connected to the first adjustment portion 41 and configured to translate parallel to the main direction X. In particular, the second adjustment portion 42 is configured to switch from a first position to a second position to switch from the opening configuration to the closing configuration.

More details regarding the second adjustment portion 42 will be provided in a later part of this description.

In more detail, the adjustment means 41, 42, 43 comprise an intermediate adjustment portion 43, which is connected to the first adjustment portion 41. The intermediate adjustment portion 43 is configured to translate parallel to the main direction X from a proximal position to a distal position to switch from the opening configuration to the closing configuration.

It should be noted that the valve 100 comprises elastic return means 5. The elastic return means 5 are configured to elastically deform between an extended configuration and a retracted configuration.

In particular, the elastic return means 5 are arranged at least at the first adjustment portion 41 to switch the first adjustment portion 41 between the distal and proximal positions. More specifically, the elastic return means 5 are in the extended configuration when the adjustment means 41, 42, 43 are in the opening configuration. The elastic return means 5 are in the retracted configuration when the adjustment means 41, 42, 43 are in the closing configuration. When in the retracted configuration, the elastic return means 5 tend to return to the extended configuration, thereby returning the adjustment means 41, 42, 43 to the opening configuration.

The valve 100 further comprises a closing element 6 configured to move parallel to the main direction X and to be sealingly arranged at the opening 3. The closing element 6 is in particular configured and shaped to interrupt fluid communication between the first chamber 1 and the second chamber 2.

More details about the closing element 6 are provided in a later part of this description.

The valve 100 comprises a switch 7 which is connected to the closing element 6. The switch 7 is also adjacent to the second adjustment portion 42. In particular, the switch 7 is activated by the second adjustment portion 42 and is configured to prevent or allow the translation of the closing element 6.

Figure 3:
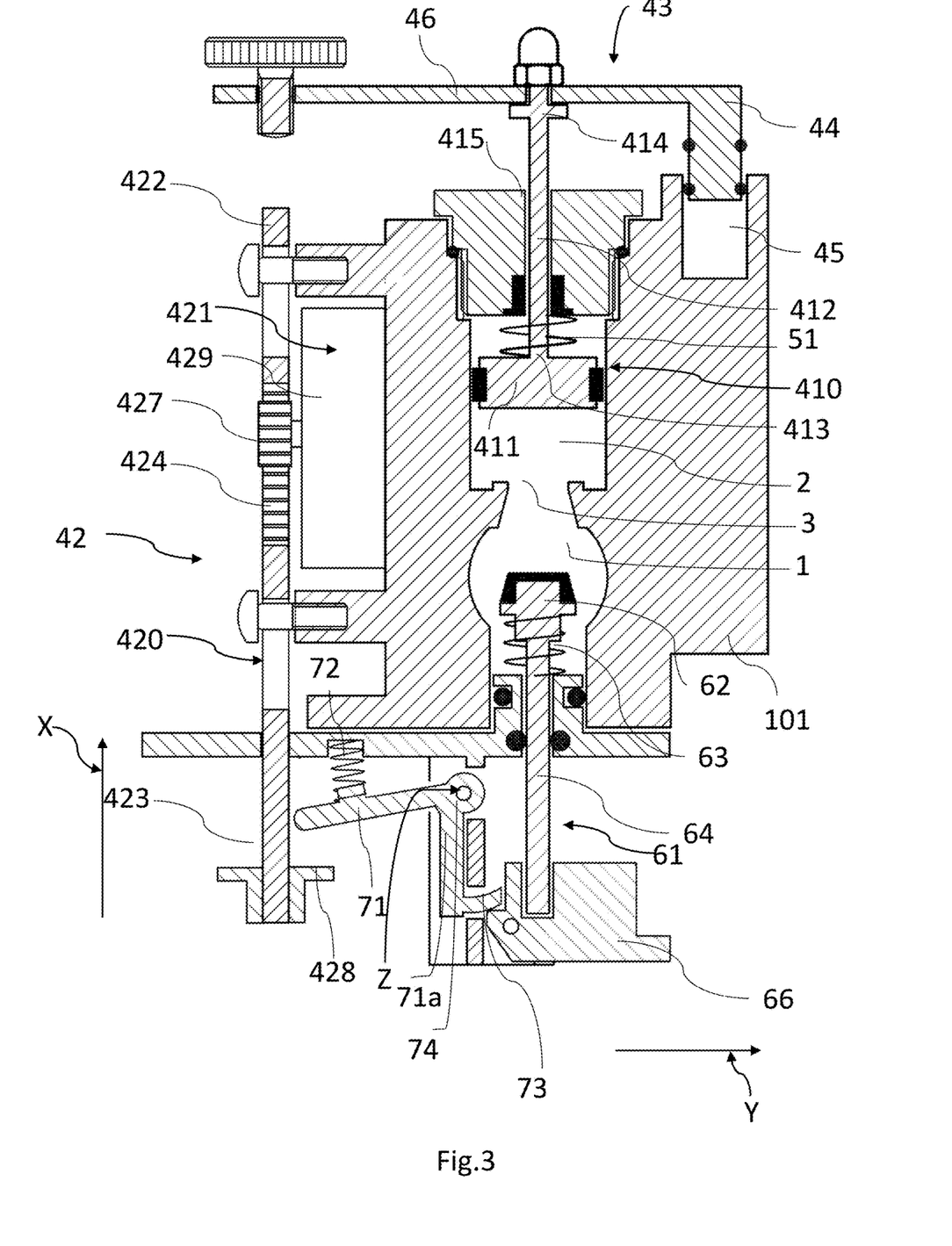
FIG. 3 is a cross-sectional front view of the valve in FIG. 1 in a second opening configuration.
Figure 8:
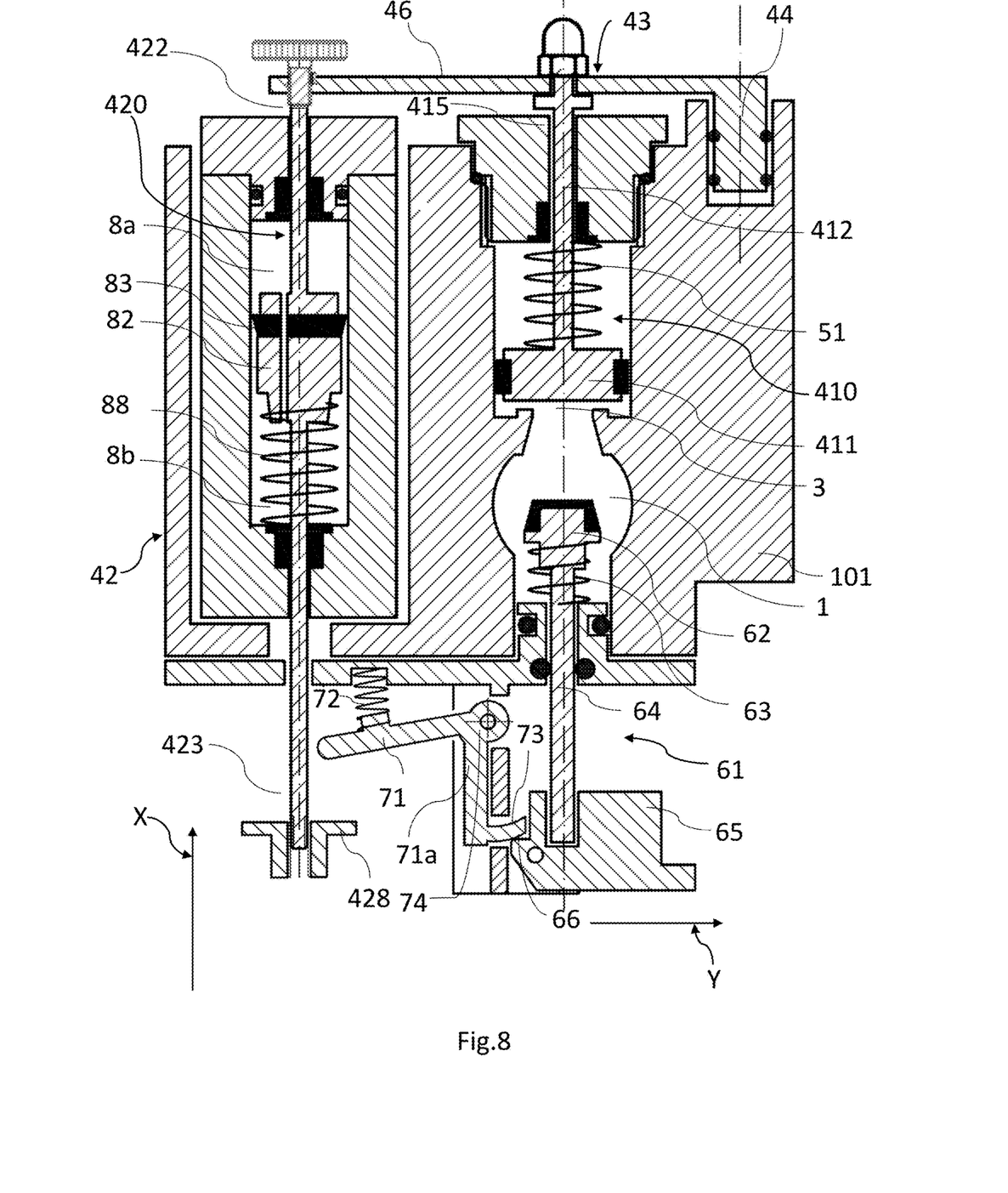
FIG. 8 is a cross-sectional front view of the valve in FIG. 6 in a second opening configuration.

With regard to the first adjustment portion 41, as shown among others in FIGS. 3 and 8, preferably this comprises a first piston 410 at least partially inserted into the second chamber 2. The first piston 410 also slides parallel to the main X direction, and is configured to translate, parallel to the main X direction, between the proximal and distal positions.

The first piston 410 comprises a head 411 and a rod 412. The head 411 of the first piston 410 slides inside the second chamber 2, parallel to the main direction X. The rod 412 of the first piston 410 is at least partially inserted into the second chamber 2. Furthermore, as shown in FIG. 3, the rod 412 of the first piston 410 is connected to the head 411 at a first end 413. The rod 412 is rigidly connected to the intermediate adjustment portion 43 at a second end 414, opposite the first end 413. In addition, the rod 412 slides inside the second chamber 2.

The first adjustment portion 41 and the intermediate adjustment portion 43 are thus configured to slide integrally parallel to the main direction X when the first adjustment portion 41, and in particular the first piston 410, switches between the proximal and distal position, to switch between the opening and closing configuration.

The first adjustment portion 41 also includes a first sliding guide 415, in fluid communication with the second chamber 2. The first sliding guide 415 runs parallel to the main direction X. The rod 412 of the first piston 410 is at least partially inserted into the sliding guide 415 and is configured to run parallel to the main direction X.

Note that the head 411 of the first piston 410 is configured to slide within the second chamber 2 between the opening 3 and the first sliding guide 415.

It should be noted that the elastic return means 5 comprise a first spring 51 associated with the first piston 410 and configured to be compressed when the first piston 410 switches from the proximal to the distal position. In an embodiment, the first spring 51 is positioned at the rod 415. Preferably, the first spring 51 is positioned externally to the rod 412 and is connected with a first end to the head 411 and with a second end opposite the first end to the first sliding guide 415.

According to an aspect, the valve 100 comprises a third chamber 30 located downstream of the second chamber 2. The valve 100 further comprises a discharge channel 31, interposed between the second chamber 2 and the third chamber 30 and configured to put the second chamber 2 and the third chamber 30 in fluid communication. The third chamber 30 is further in fluid communication with the outlet duct and is upstream of the outlet duct. In other words, the third chamber 30 is fluid-dynamically interposed between the second chamber 2 and the outlet duct, which, however, maintain fluid communication between them independently of the third chamber 30.

In the embodiment shown in FIG. 11, the third chamber 30 comprises a removable plug element 32. Note that the discharge channel 31 is configured to place, via the plug element 32, the second chamber 2 and the third chamber 30 in fluid communication. The plug element 32 comprises a chamber 34, in fluid communication with the outlet channel 31, and a connection channel 33, configured to put the chamber 34 in fluid communication with the outlet mouth 20. The plug element 32 comprises a locking piston 35, at the chamber 34, configured to engage and disengage the connection channel 33. In detail, the locking piston 35 is configured to slide along a transverse axis Z, orthogonal to the main direction and the longitudinal direction Y, and is dimensioned to allow fluid to pass between internal walls 38, of the chamber 34, and the locking piston 35.

When there is an increase in the pressure difference between the chamber 2 and the outlet mouth 20, for example when a tap to which the valve 100 is applied is activated, the locking piston 35 is configured to be sealingly arranged at the connection channel 33. In this way, it is possible to maximise the thrust on the first piston 410 when the first piston 410 switches from the proximal to the distal position.

When the pressure difference between the chamber 2 and the outlet mouth 20 is zero, for example when a tap to which the valve 100 is applied is closed, the locking piston 35 is configured to disengage the connection channel 33, allowing fluid to flow from the second chamber 2 to the outlet mouth 20 via the connection channel 33.

Preferably, the third chamber 30 comprises an elastic element 36 associated with the locking piston 35. The elastic element 36 is configured to be compressed when the locking piston 35 engages the connection channel 33 and to extend when the locking piston 35 disengages the connection channel 33.

Note that the discharge channel 31, via the plug element 32, allows the first piston 410 to move freely between the distal and proximal position, for example under conditions of no fluid flow, compensating for the pressures between the chamber 2 and the chamber 30.

Figure 13:
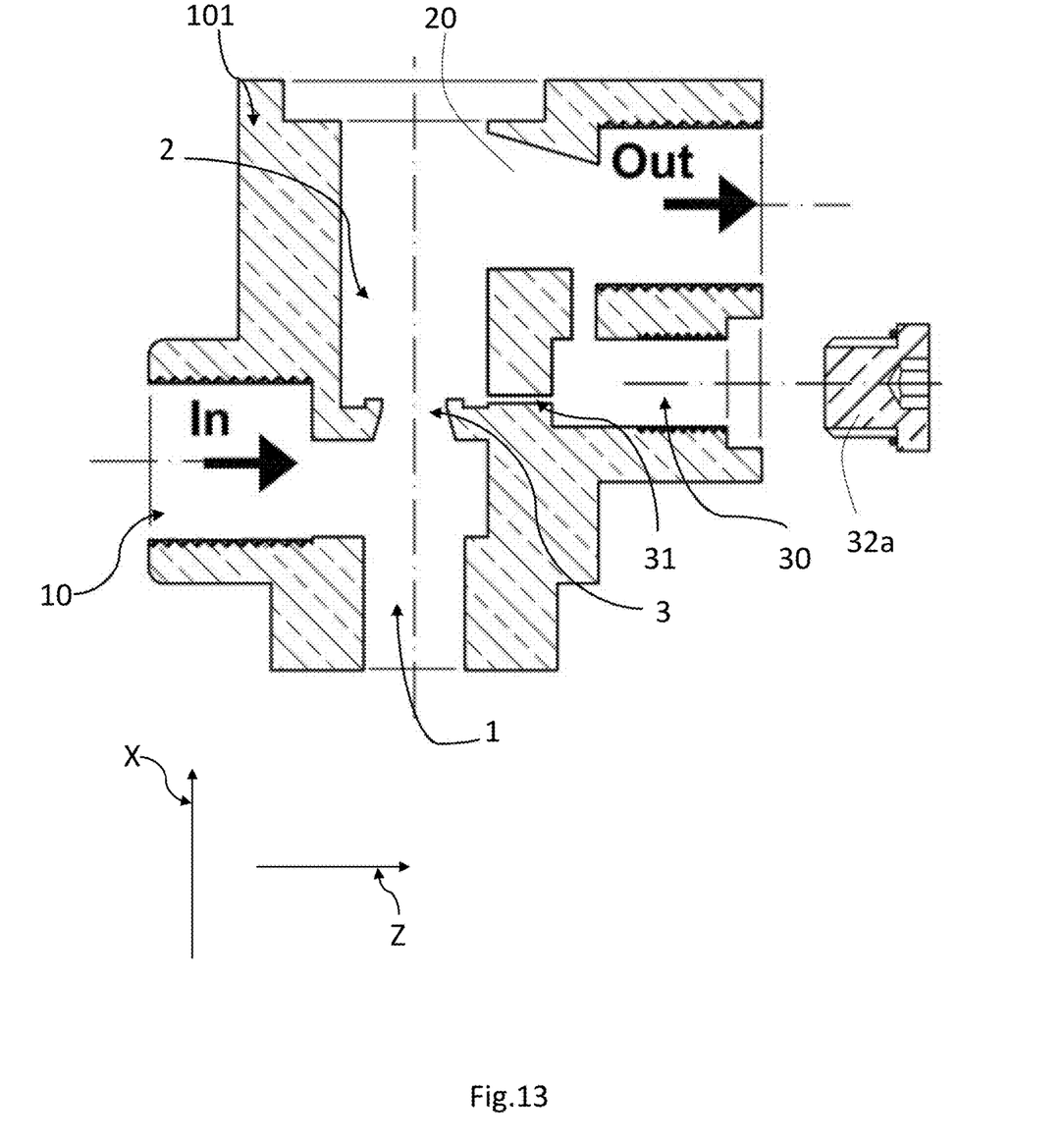
FIG. 13 is a cross-sectional side view of a further embodiment of the third chamber of the valve according to the present invention.

In the embodiment of FIG. 13, the third chamber 30 comprises a removable closing plug 32a. The closing plug 32a, when removed, allows a user to inspect the discharge channel 31.

Figure 4:
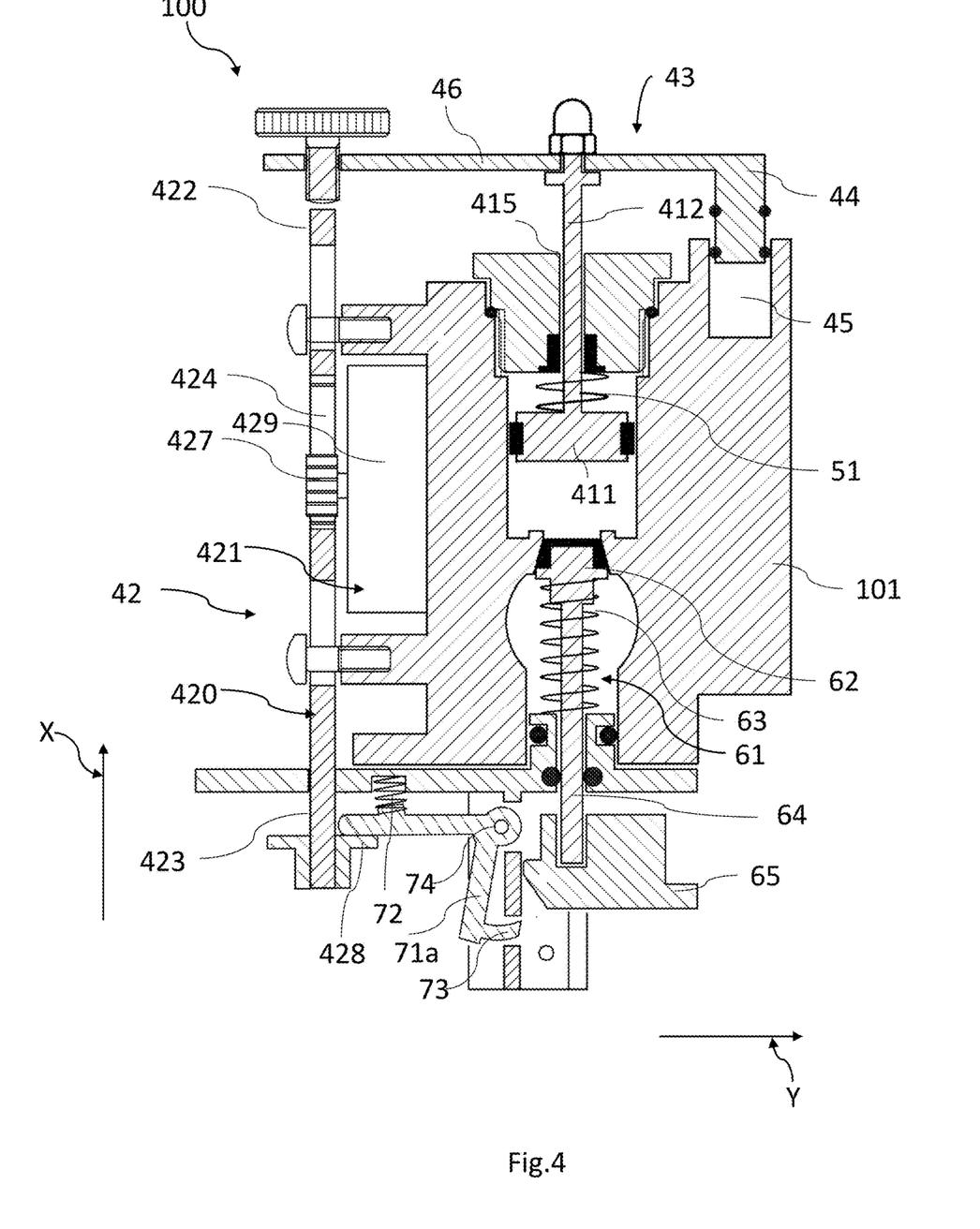
FIG. 4 is a cross-sectional front view of the valve in FIG. 1, in a closing configuration.
Figure 7:
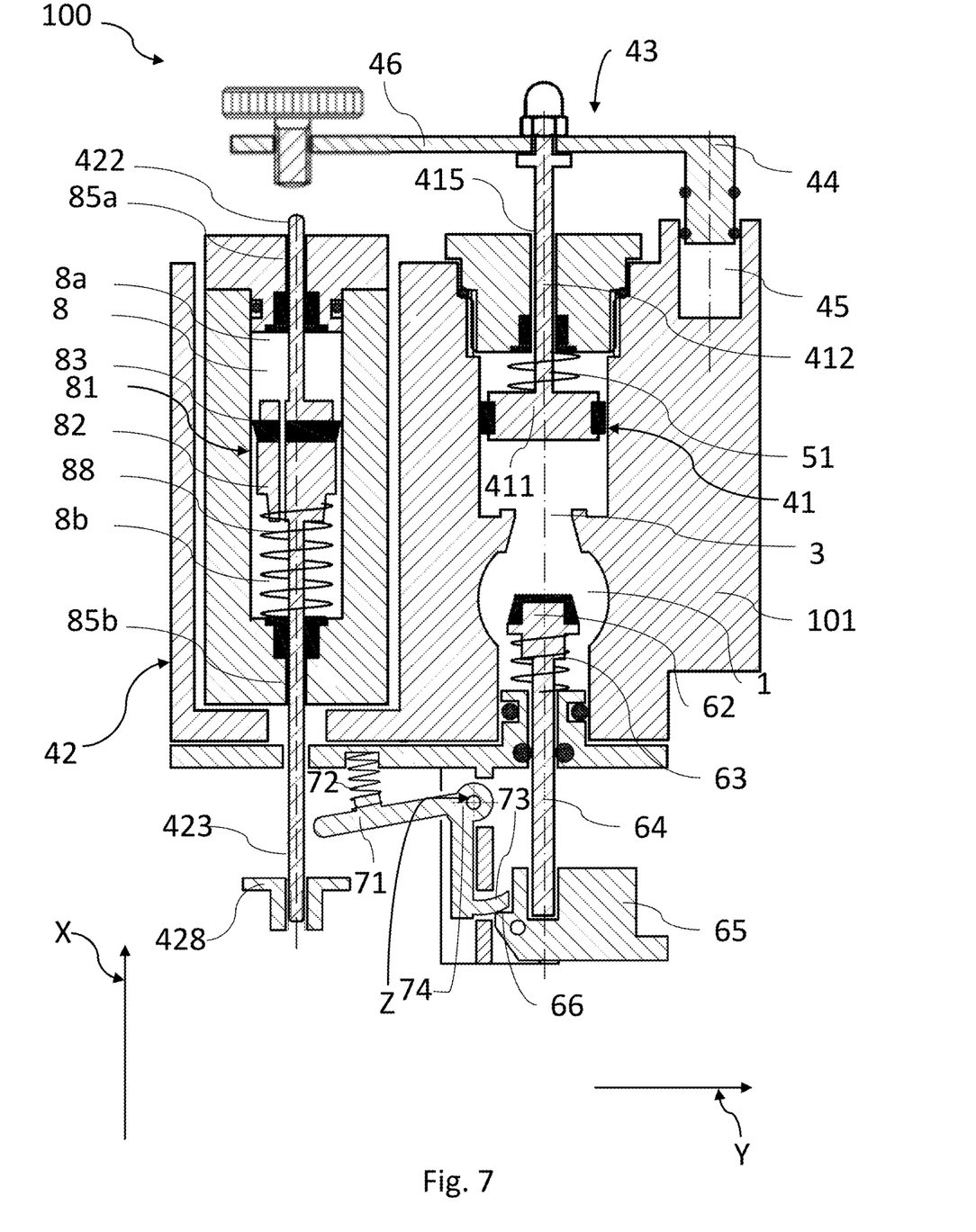
FIG. 7 is a cross-sectional front view of the valve in FIG. 6 in a first opening configuration.
Figure 9:
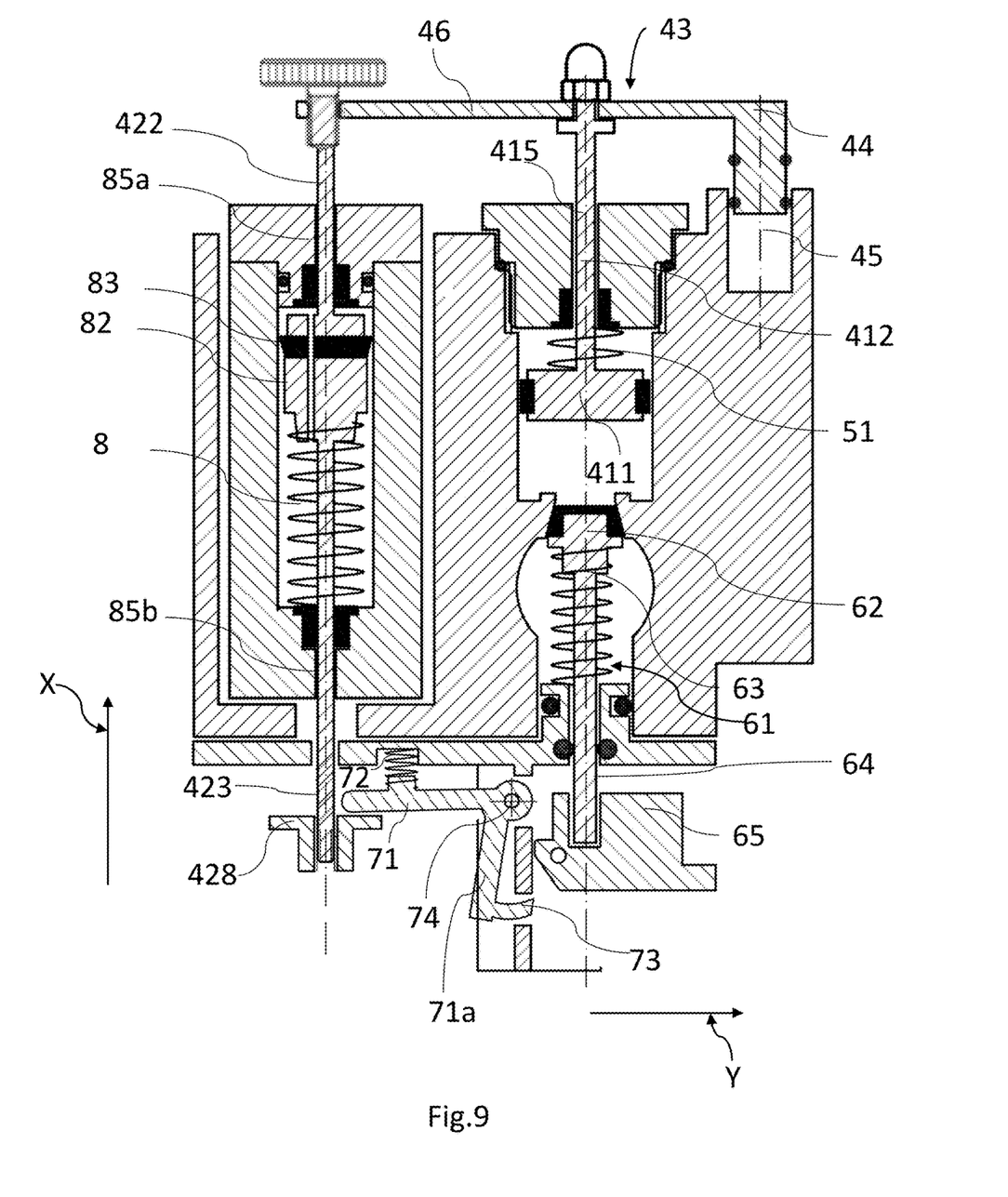
FIG. 9 is a cross-sectional front view of the valve in FIG. 6, in a closing configuration.

As for the second adjustment portion 42, it comprises a rod 420, sliding parallel to the main direction X and configured to translate at least between a first translation position when the first adjustment portion 41 is in the proximal position, as in FIGS. 2 and 7, and a second translation position when the first adjustment portion 41 is in the distal position, as in FIGS. 4 and 9. Preferably, the rod 420 of the second adjustment portion 42 extends parallel to the main direction X.

The rod 420 of the second adjustment portion 42 comprises a first terminal 422 configured to translate independently of the intermediate adjustment portion 43, when the rod 420 translates from the first to the second translation position and the intermediate adjustment portion 43 is in the distal position.

Furthermore, the first terminal 422 is configured to translate integrally with the intermediate adjustment portion 43 when the rod 420 translates from the second to the first translation position and when said intermediate adjustment portion 43 translates from the distal position to the proximal position.

In other words, when the rod 420 translates from the first to the second translation position, the first terminal 422 translates without contacting the intermediate adjustment portion 43; however, when the rod 420 translates from the second to the first translation position, the first terminal 422 translates by contacting the intermediate adjustment portion.

Still referring to the second adjustment portion 42, the rod 420 comprises a second terminal 423. In an embodiment, the second terminal 423 is spaced from the first terminal 422 along the main direction X.

Furthermore, the second terminal 423 is configured to interact with the switch 7 when the rod 420 of the second adjustment portion 42 translates from the first to the second translation position. Preferably, said second terminal 423 comprises an interaction portion 428, protruding with respect to the rod 420 and extending parallel to the longitudinal direction Y.

It should be noted that the second adjustment portion 42 further comprises control means 421 associated with the rod 420 of the second adjustment portion 42 and configured to adjust the sliding of the rod 420 of the second adjustment portion 42 from a first to a second translation position.

In detail, in a preferred embodiment, the control means 421 are configured to reduce the sliding speed of the rod 420 of the second adjustment portion 42 from the first to the second translation position. Note that the control means 421 can be pre-set to pre-select the time for switching the rod 420 from the first to the second translation position.

Note that the control means 421 are not configured to adjust the sliding of the rod 420 from the second to the first translation position. Thus, the rod 420 switches from the second to the first translation position in the shortest possible time.

In a first embodiment, the control means 421 of the valve 100 comprise a mechanical chronometer 429, which is connected to the rod 420.

The mechanical chronometer 429 comprises a protective casing and a plurality of springs, gears and balances, positioned inside the protective casing. The mechanical chronometer 429 is therefore configured to control the sliding speed of the rod 420 from the first to the second translation position.

Figure 12:
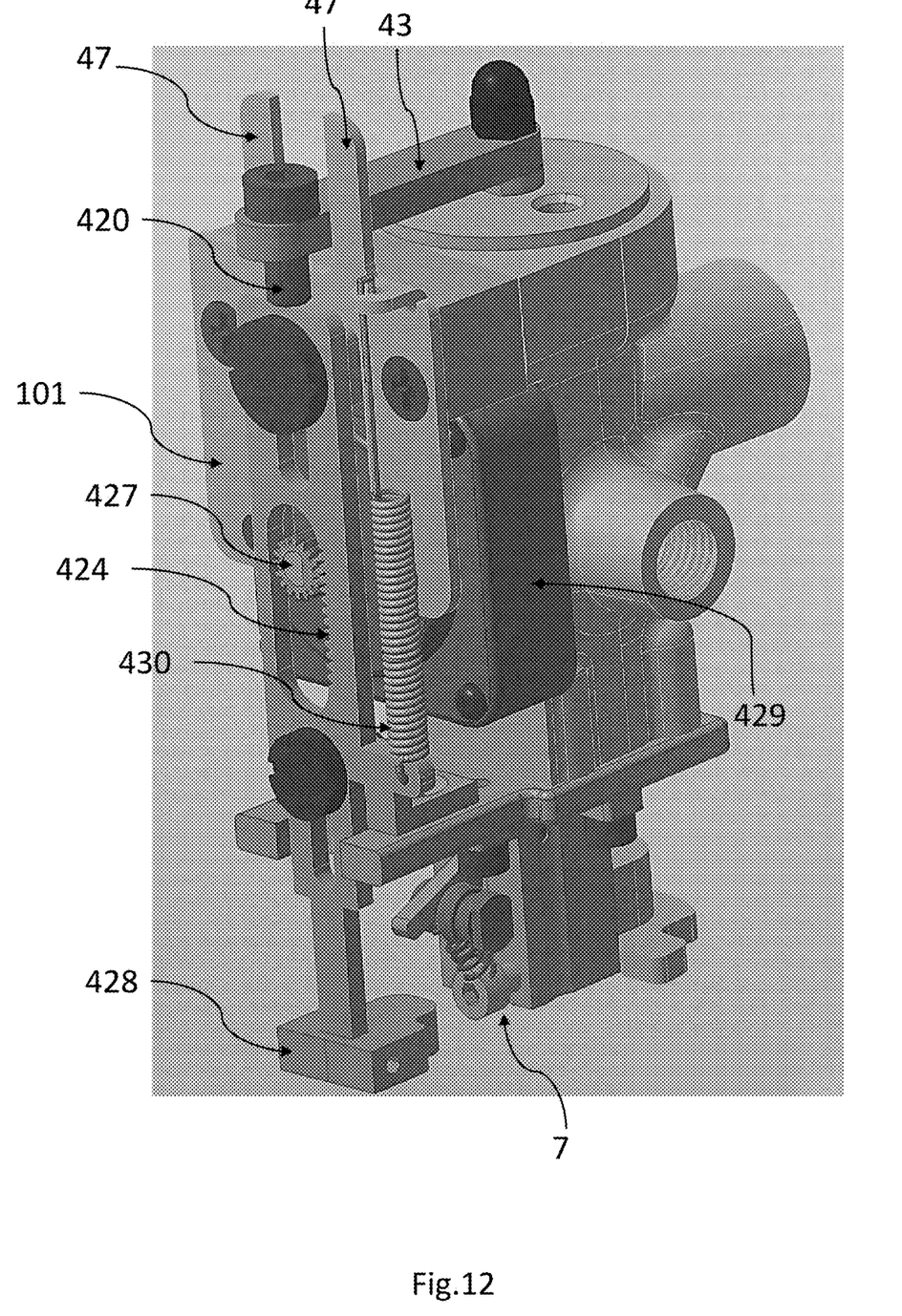
FIG. 12 is a perspective view of a valve according to a third embodiment of the present invention.

In an alternative embodiment, shown for example in FIG. 12, the control means 421 of the valve 100 comprise a longitudinal spring 430, arranged parallel to the rod 420. Advantageously, the appropriate selection or calibration of the longitudinal spring 430 allows the sliding speed of the rod 420 to be controlled, functionally replacing the internal springs of the mechanical chronometer 429.

The mechanical chronometer 429 is itself known to a person skilled in the art and will therefore not be described further.

Figure 5:
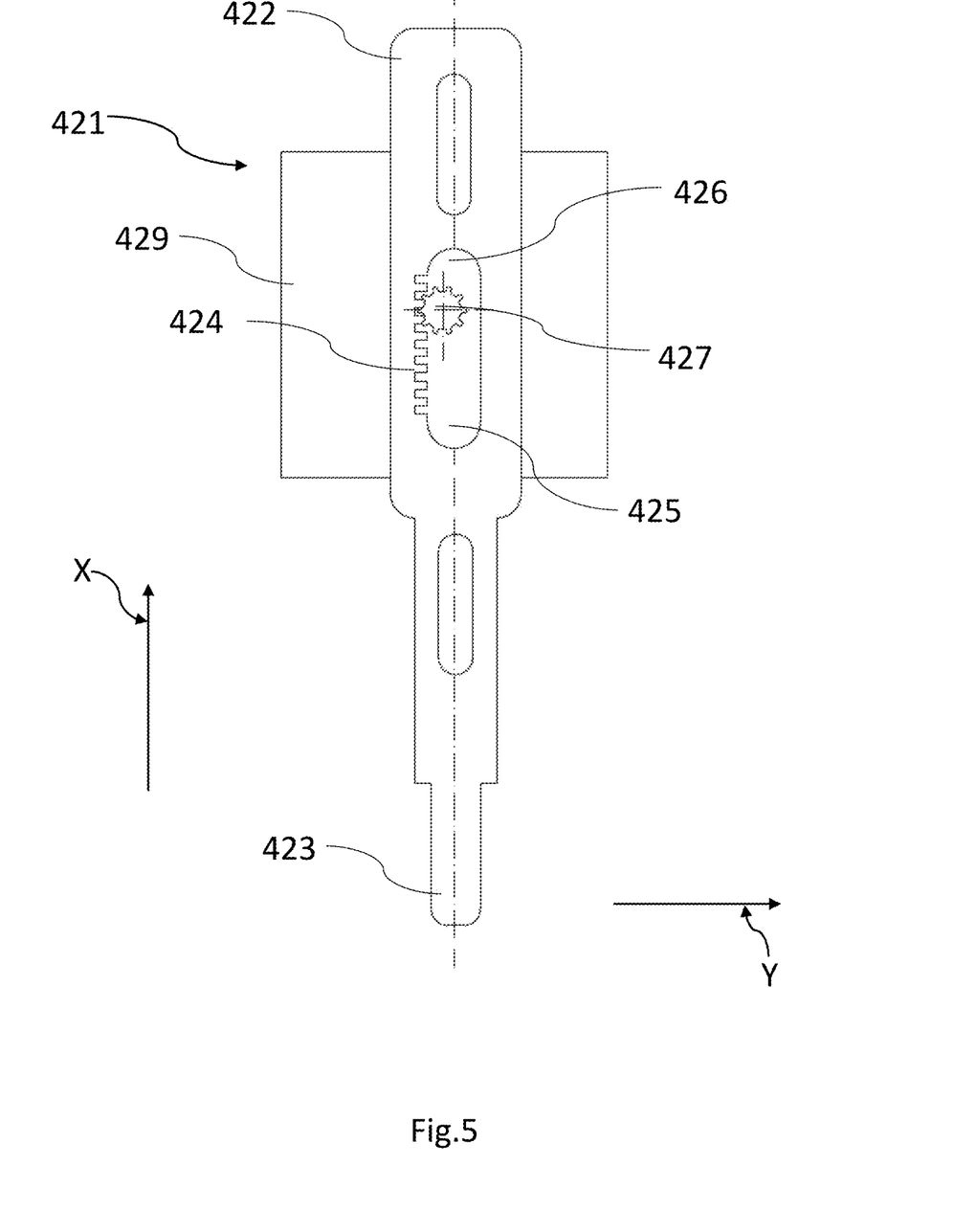
FIG. 5 is a side view of a detail of the valve in FIG. 1.

Preferably, the rod 420 has a rack 424, extending parallel to the main direction X, with a first end 426 and a second end 425, spaced parallel to the main direction X. In addition, the second adjustment portion 42 comprises a gear wheel 427, configured to run parallel to the main direction X, between the first and second ends 426, 425, at the rack 424, shown in FIG. 5. In an embodiment, the gear wheel 427 is connected to the mechanical chronometer 429, which regulates the running thereof. In particular, the gear wheel 427 is positioned at the first end 426 when the first adjustment portion 41 is in the proximal position. In addition, the gear wheel 427 is positioned at the second end 425 when the first adjustment portion 41 is in the distal configuration. In other words, when the rod 420 is in the first translation position, the gear wheel 420 is at the first end 426, whereas when the rod 420 is in the second translation position, the gear wheel 420 is at the second end 425.

In a further embodiment, the valve 100 comprises a further fluid chamber 8, as shown for example in FIG. 7. In addition, the second adjustment portion 42 comprises a second piston 81. Preferably, the second piston 81 is at least partially inserted into the further fluid chamber 8 and slides parallel to the main direction X, at least between the first and second translation positions.

The second piston 81 comprises the rod 420. Note that the rod 420 of the second piston 81 is at least partially inserted inside the further fluid chamber 8.

In addition, the further fluid chamber 8 comprises a second sliding guide 85a and a third sliding guide 85b, shown in FIG. 7. In addition, the second and third sliding guides 85a, 85b are parallel to the main direction X and are spaced along said main direction X. In an embodiment, the second and third sliding guides 85a, 85b are aligned and arranged at opposite ends of the further fluid chamber 8.

Note that the rod 420 is at least partially inserted and sliding within the second and third sliding guides 85a, 85b. In detail, the first end 422 of the rod 420 slides at the second sliding guide 85a and the second end 423 of the rod 420 slides at the third sliding guide 85b.

Note that the second piston 81 comprises further elastic return means 88, which are configured to switch between a compressed and an extended configuration when the rod 420 switches between the first and second translation positions. Preferably, the further elastic return means 88 are positioned at the rod 420.

In addition, the second piston 81 comprises a head 82 inserted into the further fluid chamber 8 at the rod 420. In more detail, the head 82 slides inside the further fluid chamber 8. In addition, the head 82 slides between the second and third sliding guides 85a, 85b.

Figure 10:
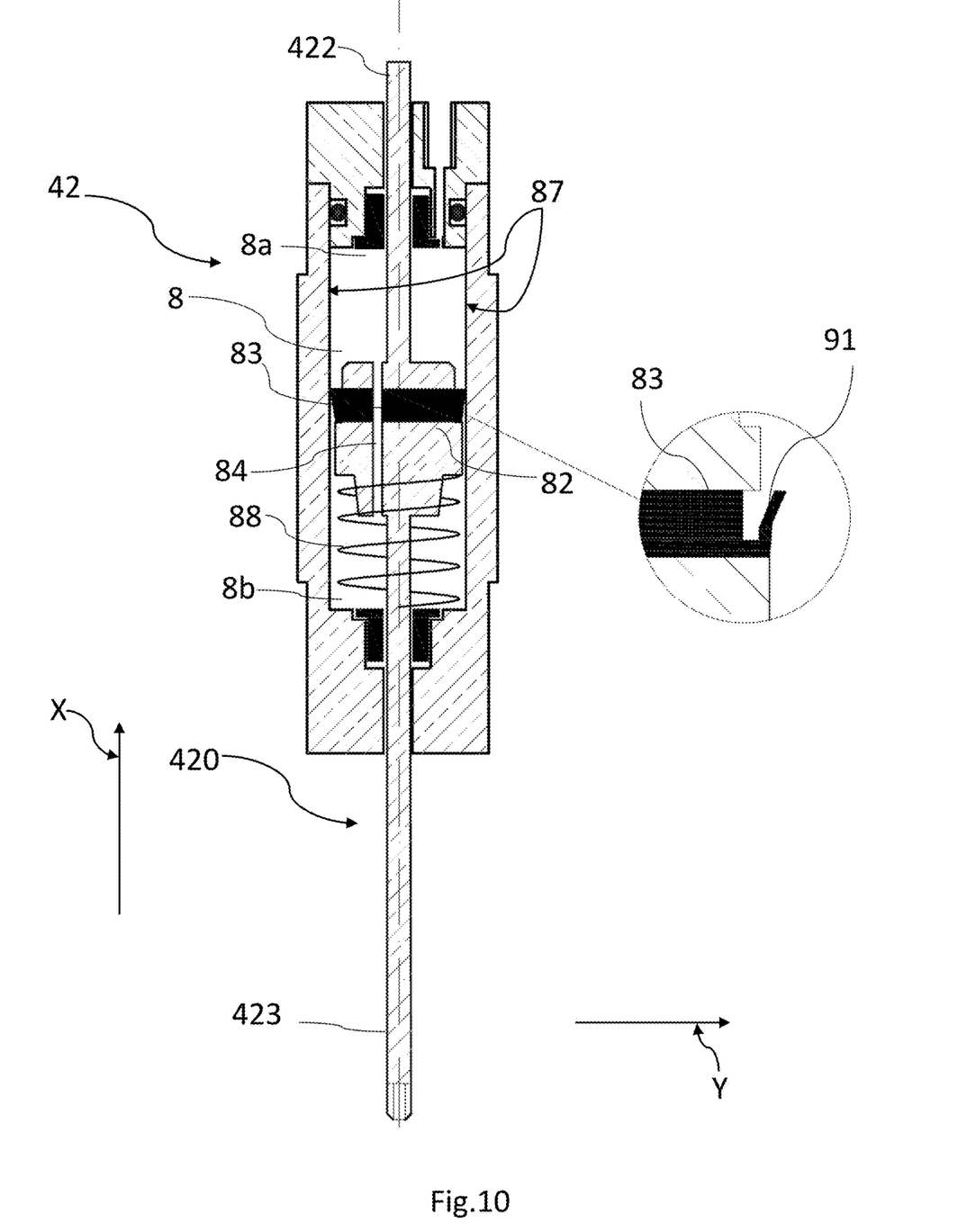
FIG. 10 is a cross-sectional front view of a detail of the valve of FIG. 6.

In more detail, the head 82 of the second piston 81 comprises a one-way gasket 83, visible in FIG. 10, which is configured to allow fluid to flow within the further fluid chamber 8 when the second piston 81 slides from the second to the first translation position.

In other words, the one-way gasket 83 and the head 82 of the second piston 81 subdivide the further fluid chamber 8 into a first portion of further fluid chamber 8a, identified between the head 82 of the second piston 81 and the second sliding guide 85a, and a second portion of further fluid chamber 8b, identified between the head 82 of the second piston 81 and the third sliding guide 85b. The volumes of the first and second portions of the further fluid chamber 8a, 8b vary as the head 82 of the second piston 81 slides within the further fluid chamber 8, parallel to the main direction X.

In more detail, the one-way gasket 83 is configured to allow fluid to flow from the second portion of further fluid chamber 8b to the first portion of further fluid chamber 8a.

Still preferably, the one-way gasket 83 comprises a finned edge 91, shown in FIG. 10. This finned edge 91 is configured to open sealingly with an inner surface 87 of the further sliding chamber 8 when the head 82 of the second piston 81 slides from the first to the second translation position. In other words, the finned edge 91 is configured to open sealingly in the event of fluid flow from the second to the first portion of further fluid chamber 8b, 8a.

With regard to the finned edge 91, it is further configured to close, deviating from the inner surface 87 of the further fluid chamber 8 when the head 82 of the second piston 81 slides from the second to the first translation position. In other words, the finned edge 91 is configured to close in the event of fluid flow from the first to the second portion of further fluid chamber 8a, 8b.

In other words, the finned edge 91 is configured to close when the second piston 81 slides from the second to the first translation position. This speeds up the passage of fluid between the second and first portions of further fluid chamber 8b, 8a.

Furthermore, as shown in FIG. 10, the head 82 of the second piston 81 has a sliding channel 84 configured to allow fluid to flow through it when the second piston 81 switches from the first to the second translation position and vice versa. In detail, the sliding channel 84 is dimensioned to control the speed of the translation movement of the second piston 81 inside the further fluid chamber 8. In other words, the smaller the sliding channel 84 is, the slower the fluid will flow between the first and second portions of further fluid chamber 8a, 8b of the further fluid chamber 8 and vice versa. Preferably, the sliding channel 84 extends parallel to the main direction X.

Note that the intermediate adjustment portion 43 is configured to contact the second adjustment portion 42, as shown in FIGS. 2, 7 and 8. In detail, the intermediate adjustment portion 43 comprises a main body 46, preferably extending parallel to a longitudinal direction Y, orthogonal to the main direction X.

As shown, for example in FIG. 2, the intermediate adjustment portion 43 may comprise an arm 44 sliding parallel to the main direction X, at least partially inserted into a stabilisation guide 45 at the valve body 101 and parallel to the main direction X. The arm 44 is configured to stabilise the main body 46 when the intermediate adjustment portion 43 switches from the proximal configuration to the distal configuration and vice versa.

The intermediate adjustment portion 43 may comprise at least one pair of rails 47, shown in FIG. 12, at the valve body 101. Said pair of rails 47 extends parallel to the main direction X. Preferably, the main body 46 is positioned to slide between the pair of rails 47, so as to stabilise when the intermediate adjustment portion 43 switches from the proximal configuration to the distal configuration and vice versa.

With regard to the switch 7 of the valve 100, it comprises a rod-like element 71 activatable by the second adjustment portion 42, when said second adjustment portion 42 switches from the first position to the second position. In detail, the rod-like element 71 is activated by the second end 423 of the rod 420, preferably by the interaction portion 428.

The switch 7 further comprises an activation spring 72 at the rod-like element 71, configured to switch between an extended configuration and a compressed configuration, when the second adjustment portion 42 switches from the first to the second position.

In addition, the switch 7 comprises a tooth 73 rigidly connected to the rod-like element 71. The tooth 73 is configured to switch between a locked position and a sliding position. In the locked position, the tooth 73 interacts with the closing element 6 to keep it stationary when the activation spring 72 is in the extended configuration; in the sliding position, the tooth 73 is spaced from the closing element 6, allowing the sliding thereof, when the activation spring 71 is in the compressed configuration.

Note that tooth 73 is rigidly connected via a further rod-like element 71a to the rod-like element 71. Preferably, the tooth 73 is rigidly connected to the rod-like element 71 via a pin 74, configured to rotate about the transverse axis Z. It should be noted that preferably the activation spring 72 and the pin 74 are positioned at opposite ends of the rod-like element 71. In detail, in a preferred embodiment, the activation spring 72 is positioned closer to the second adjustment portion 42 than the pin 74.

In detail, when the rod-like element 71 is activated by the rod 420, and the activation spring 72 switches from the extended configuration to the compressed configuration, the rod-like element 71 and the tooth 73 rotate rigidly with respect to the pin 74, so that the tooth 73 is spaced away from the locking element 6, allowing the sliding thereof.

In detail, the closing element 6 comprises a closing piston 61 at least partially inserted into the first chamber 1 and sliding parallel to the main direction X.

In an embodiment, the closing piston 61 comprises a plug 62 counter-shaped with the opening 3, sliding in the first chamber 1 and configured to engage the opening 3 when the first adjustment portion 41 is in the distal position. The closing piston 61 also comprises an elastic element 63 configured to extend when the counter-shaped plug 62 engages the opening 3.

Said closing piston 61 further comprises a closing rod 64, at least partially inserted into the first chamber 1, configured to slide parallel to the main direction X and connected to the counter-shaped plug 62. In an embodiment, the elastic element 63 is positioned at the closing rod 64.

The closing element 61 comprises a locking element 65, which is connected to the closing rod 64 and opposed to the counter-shaped plug 62. Said locking element 65 is configured to run integrally with the closing element 6 parallel to the main direction X.

Note also that the tooth 73 of the switch 7 is configured to interact with said locking element 65 when the activation spring 72 is in the extended configuration.

In particular, the locking element 65 has a seat 66 configured to accommodate the tooth 73. The seat 66 is a portion suitably shaped to accommodate the tooth 73, formed in the locking element 65, and is configured, for example, with a groove or recess counter-shaped to the shape of the tooth 73. The tooth 73 is configured to be inserted into the seat 66, and to be pulled out of the seat 66 when the rod-like element 71 is activated by the second adjustment portion 42 when the second adjustment portion 42 switches from the first to the second position.

The valve 100 has a starting position and an operating condition, described below.

In the starting position, there is no flow. Consequently, there is no fluid passage between the first chamber 1 and the second chamber 2. In this condition, the adjustment means 41, 42, 43 are all in the opening configuration, the elastic return means 5 are in the extended configuration and the tooth 73 is inserted into the seat 66. This condition is shown in FIGS. 2 and 8.

In the operating condition, there is a flow of fluid between the first chamber 1 and the second chamber 2, and the time interval in which the flow is present is greater than a predetermined time interval for which the valve 100 has been calibrated. With the application of the valve 100 to a tap, for example, the second operating condition is verified when the tap is left open by accident.

In this operating condition, the fluid initially fills the first chamber 1 and then progressively fills the second chamber 2 through the opening 3.

When the second chamber 2 is full, the first piston 410 translates parallel to the main direction X from the proximal to the distal position, compressing the first spring 51. The first piston 410 activates by pushing the intermediate adjustment portion 43, which translates from the proximal position to the distal position, activating the second adjustment portion 42, as shown in FIGS. 3 and 7.

The rod 420 then begins to move at a predetermined speed, specifically regulated by the control means 421, switching from the first to the second translation position.

In detail, in the first embodiment, shown in FIGS. 1 to 5, the sliding of the gear wheel 427 from the first to the second end 426, 425 is regulated by the mechanical chronometer 429. In other words, the sliding of the rod 420 from the first to the second translation position is regulated by the mechanical chronometer 429 by means of the rotation of the toothed wheel 427. In the second embodiment, shown in FIGS. 6 to 11, the sliding of the second piston 81 inside the further fluid chamber 8 is regulated by the sliding of fluid inside the sliding channel 84 from the second portion of further fluid chamber 8b to the first portion of further fluid chamber 8a.

In this way, the rod 420, and in particular the second terminal 423, applies a force parallel to the main direction X on the switch 7, once the rod 420 is in the second translation position. In detail, the second terminal 423 interacts with the rod-like element 71, so that the activation spring 72 is compressed. Thus, once the activation spring 72 is in the compressed configuration, the tooth 73 rotates around the pin 74, disengaging the tooth 73 from the seat 66.

Since the locking element 65 is disengaged from the tooth 73, the closing body 61, stressed by the action of the elastic element 63 which was compressed, translates parallel to the main direction X, and the counter-shaped plug 62 engages the opening 3, as shown in FIGS. 4 and 9.

To restore operation of the valve 100, the counter-shaped plug 62 must be restored to its starting position by manually pulling the locking element 65 to release the opening 3. The tooth 73 thus retracts into the seat 66 and the valve 100 is again set in the operating condition.

The invention claimed is:

1. A shut-off valve comprising:
a first chamber comprising an inlet mouth for a fluid, said inlet mouth being connectable to an inlet duct upstream of the first chamber,
a second chamber in fluid communication with the first chamber and placed downstream of the first chamber, said second chamber comprising an outlet mouth for a fluid, said outlet mouth being connectable to an outlet duct downstream of the second chamber;
a connection opening between the first chamber and the second chamber;
adjustment members switchable between a closing configuration and an opening configuration, the adjustment members comprising:
a first adjustment element at least in part inserted in the second chamber and configured to translate with respect to the opening and parallel to a main direction at least from a proximal position to a distal position to switch from the opening configuration to the closing configuration;
a second adjustment element connected to the first adjustment element and configured to translate parallel to the main direction from a first position to a second position to switch from the opening configuration to the closing configuration,
elastic return members configured to elastically deform between an extended configuration and a retracted configuration, said elastic return members being arranged at least at the first adjustment element to switch it between the distal and proximal positions;
an intermediate adjustment element, connected to the first adjustment element and configured to translate parallel to the main direction from a proximal position to a distal position to switch from the opening configuration to the closing configuration
a closing element configured to translate parallel to the main direction to be sealingly arranged at the opening and interrupt the fluid communication between the first chamber and the second chamber,
a switch activatable by said second adjustment element, connected to the closing element and configured to prevent or allow the translation of said closing element.

2. The shut-off valve of claim 1, wherein the first adjustment element comprises a first piston at least partially inserted in the second chamber, sliding parallel to the main direction, and configured to translate, parallel to the main direction, between the proximal position and the distal position.

3. The shut-off valve of claim 2, wherein said elastic return members comprise a first spring associated with the first piston and configured to be compressed when the first piston switches from the proximal position to the distal position.

4. The shut-off valve of claim 1, wherein the second adjustment element comprises:
a rod, slidable parallel to the main direction configured to translate at least between a first translation position, when the first adjustment element is in the proximal position, and a second translation position when the first adjustment element is in the distal position,
control members associated with the rod and configured to adjust the sliding of the rod from a first to a second translation position.

5. The shut-off valve of claim 4, wherein the rod comprises a first terminal configured to translate independently of the intermediate adjustment element, when the rod translates from the first to the second translation position and the intermediate adjustment element is in the distal position, the first terminal being configured to translate integrally with the intermediate adjustment element, when said intermediate adjustment element translates from the distal position to the proximal position.

6. The shut-off valve of claim 4, wherein the rod comprises a second terminal configured to translate and interact with the switch when the rod translates from the first to the second translation position.

7. The shut-off valve of claim 4, wherein the control members comprise a mechanical chronometer, connected to the rod.

8. The shut-off valve of claim 1, wherein the switch comprises:
- a rod-like element activatable by the second adjustment element, when said second adjustment element switches from the first position to the second position,
- an activation spring at the rod-like element, configured to switch between an extended configuration and a compressed configuration, when the second adjustment element switches from the first to the second position,
- a tooth rigidly connected to the rod-like element, said tooth being configured to switch between a locked position, in which the tooth is configured to interact with the closing element and to keep it stationary when the activation spring is in the extended configuration, and a sliding position, in which the tooth is spaced from the closing element, allowing the sliding thereof, when the activation spring is in the compressed configuration.

9. The shut-off valve of claim 1, also comprising a third chamber downstream of the second chamber and a discharge channel interposed between the second and the third chamber and configured to put the second chamber and the third chamber in fluid communication, said third chamber comprising a plug element comprising a chamber in fluid communication with the discharge channel, a connection channel, configured to put the chamber in fluid communication with the outlet mouth and a locking piston, at the chamber, configured to engage and disengage the connection channel.

10. The shut-off valve of claim 1, wherein the intermediate adjustment element comprises a main body, connected to the first adjustment element and an arm connected to said main body and sliding parallel to the main direction, at least partially inserted in a stabilization guide, parallel to the main direction, said arm being configured to stabilize the intermediate adjustment element when said intermediate adjustment element reversibly switches from the proximal configuration to the distal configuration.

* * * * *